Patented Nov. 2, 1948

2,452,606

UNITED STATES PATENT OFFICE 2,452,606

PHTHALOCYANINE PIGMENTS AND PROCESS FOR PRODUCING SAME

Alfred Siegel, Roselle, N. J., assignor to E. I. du Pont de Nemours & Company, Wilmington, Del., a corporation of Delaware No Drawing. Application November 20, 1945, Serial No. 629,921

7 Claims. (Cl. 106—289)

This invention relates to the manufacture of novel phthalocyanine coloring materials, and more particularly to the manufacture of improved pigments comprising phthalocyanine dyestuffs associated in intimate, coherent relationship with certain inorganic, anhydrous white pigments.

The phthalocyanines comprise important blue-to-green synthetic pigments and dyes produced by methods such as those referred to in Industrial and Engineering Chemistry, vol. 34, July 1939, commencing at page 839. In general, these methods comprise reacting phthalonitrile with various metallic salts, the reaction between phthalonitrile and copper or copper salts, particularly cuprous chloride ($Cu_2Cl_2$) and cupric chloride ($CuCl_2$) to form phthalocyanine or monochlor copper phthalocyanine being of outstanding interest and forming one of the commercially practical methods for manufacturing the pigment. The products obtained in this latter reaction are blue in color, but in their original form possess substantially no value as pigments and therefore must be suitably conditioned (usually by acid-pasting, i. e., solution in concentrated sulfuric acid followed by drowning in water) to convert them to forms useful for pigmentary purposes.

The reaction involving such copper derivative production is violently exothermic and can easily get out of control. Consequently, such temperatures may prevail that the pigment is detrimentally affected with serious damage occurring, particularly to its tinctorial properties.

Other serious difficulties encountered with certain common copper phthalocyanine pigments include a manifest tendency to grow relatively large crystals in coating compositions containing certain types of solvents to result in objectionable, serious loss in the color value of the composition; a tendency towards severe flocculation and separation from other pigments employed in the coating composition, and especially in those of the lacquer system type, to result in uneconomical usage of the phthalocyanine as well as extreme difficulty in duplicating shades.

Various expedients have been resorted to in attempts at controlling the exothermic reaction referred to, such as by conducting the reaction in the presence of certain diluents which are inert with respect to the reaction. Diluents contemplated for this purpose include water-soluble as well as water-insoluble materials and high boiling solvents. Inert solid substances so used include salts of alkali and alkaline earth metals and all of the inert substances so employed function to control the temperature largely by their diluting effect. Although successful to some extent in controlling the reaction, the use of solid, inert diluents renders necessary the provision of means for separating the pigment from the diluent, such as by solution of the phthalocyanine pigment in concentrated sulfuric acid with reprecipitation by drowning in water after separation of the diluent by filtration. Furthermore, the phthalocyanine pigment from such reaction-controlling processes exhibits substantially the same deficiencies in respect to growing relatively large crystals in coating compositions and severe flocculation and separation from a modifying pigment with which the phthalocyanine may be associated in the coating composition.

It is among the objects of this invention to overcome these and other deficiencies which characterize prior phthalocyanine coloring materials, and to provide methods and means useful for attaining such objects. Particular objects of the invention include: the provision of a novel, improved phthalocyanine pigment, together with commercially practicable methods for producing the same; the manufacture of phthalocyanine pigments which do not require acid-pasting or other treatment to condition the pigment prior to use; the manufacture of coalesced phthalocyanine pigments free from such objectionable disadvantages as crystal growth, separation and flocculation when employed in various coating compositions; and the production of such non-flocculating, non-separating coalesced phthalocyanine pigment through use of a special form of substratum. Other objects and advantages of the invention will be apparent from the ensuing description thereof.

The foregoing and other objects are accomplished in this invention which embodies the discovery that if in phthalocyanine manufacture there is employed an anhydrous, reactive type of solid diluent or substratum, as distinguished from a hydrated form, one quite unexpectedly obtains a novel, coalesced phthalocyanine coloring material which, in addition to its advantageous non-flocculating and non-separating characteristics, is highly useful in all types of pigment application.

Prior to undertaking a more detailed description of the invention, certain of the terms used herein and in the appended claims now will be defined:

The term "coalesced pigment" means an intimate, adhering union or combination of a phthalocyanine pigment with at least one of the useful anhydrous pigment substances or substrata herein contemplated, which coalesced product behaves in every way as a single, inseparable pigmentary material. As will appear more particularly hereinafter, such coalesced product is readily distinguished from an intimate mechanical mixture by either (a) microscopic examination, such as with the electron microscope, or (b) by its behavior in a coating composition vehicle.

The term "separation" means the disseverance or disassociation in a coating composition vehicle of a phthalocyanine from one or more other pigmenting substances or substrata with which the phthalocyanine has been in intimate admixture or association.

The term "flocculation" refers to a state of suspension of pigment particles in a medium in which the individual particles are distributed, not at random, but in an arrangement consisting of a loose cluster-like structure, indicating that attractive forces operating between the individual particles have dominated over the diffusive forces. In phthalocyanine tints this phenomenon can usually be observed by the difference between two layers of the same composition which have been dried under different conditions. This may be readily noted, for instance, in the difference between a sprayed film and a film poured over the top thereof, or by noting the difference between a film which has been allowed to dry normally and a portion of the same film which has been rubbed when partially dry. In the first case the poured film usually appears weaker than the sprayed film, while in the second case the rubbed portion usually appears stronger than the normally-dried portion. The first test is more effective for systems which dry wholly by evaporation, while the second test is most effective with systems which dry by oxidation.

In its broadest embodiment the invention comprises producing a non-flocculating, non-separating, coalesced type of phthalocyanine coloring material by reacting in the substantial absence of moisture and at temperatures ranging from about 150–300° C. an aryl-orthodinitrile with a metal or a derivative thereof in the presence of a substantial amount of a potentially reactive substratum comprising a white, anhydrous pigmentary metal oxide selected from the group consisting of titanium oxide and zirconium oxide.

In a more specific and preferred embodiment, the invention comprises reacting, in the absence of moisture and at a temperature ranging from about 180–250° C., an intimate mixture of phthalonitrile, a metallic salt, and an anhydrous substratum selected from the group consisting of calcined, pigmentary titanium oxide and zirconium oxide, conducting said reaction for a period of from about one-half to two hours, and while mechanically agitating the reactants, and upon completion of the reaction cooling and grinding the resulting friable pigment product.

In one practical and preferred adaptation of the invention, appropriate amounts of an intimate mixture of phthalonitrile and a copper salt, such as cupric chloride, are admixed with a calcined pigmentary form of anhydrous titanium dioxide, the amount of the latter ranging from about one-half to about twenty parts of $TiO_2$ per calculated part of phthalocyanine pigment in the mixture. The resulting mixture is placed in a suitable reaction vessel, preferably a heated ball mill or rotary reactor adapted to intimately grind and mix the reactants during all stages of the reaction, such as the rotary baker described in Dahlen, et al. U. S. Patent 2,153,300, wherein it is gradually heated to a temperature of about 200° C., and is held at a temperature of about 200–250° C. for two or three hours, or until the desired reaction becomes complete. The reaction mass is then cooled and pulverized or ground to a suitable particle size for pigmentary purposes. If desired, any unreacted phthalonitrile, by-products of the reaction, such as phthalimide, and any unreacted metallic salts, may be removed from the pigment by extraction with water. Since the reaction mixture has a tendency to be somewhat acidic, it is sometimes desirable to extract with a dilute alkaline solution, such as dilute ammonia water.

The recovered product will be found to be readily utilizable as a pigment without further conditioning, and it will exhibit no tendency towards crystal growth in the presence of solvents. Furthermore, it not only will exhibit complete freedom from flocculation and separation in coating compositions, but desirably functions to inhibit such separation or flocculation when further mixed with other pigmentary substances, including additional phthalocyanine, additional substrata, or both.

To a more complete understanding of the invention, the following examples, which are merely illustrative and not to be construed as in limitation of the invention, are given:

*Example I*

A pre-mix was made by ball milling 225 parts of a calcined, anhydrous pigmentary grade of anatase $TiO_2$, 12.5 parts of cuprous chloride, and 67.3 parts of phthalonitrile together. This pre-mix was charged into a rotary baker apparatus similar in type to that shown in U. S. Patent 2,153,000, heated over a period of about 30 minutes to a temperature of 180° C. and held at that temperature for 2 hours. Upon cooling, the charge was found to consist of a coalesced pigment or friable powder with an intense blue color. Upon simple pulverization the product had excellent properties as a blue pigment without further treatment. When incorporated in a conventional type lacquer vehicle, it exhibited complete freedom from flocculation and separation to provide an excellent type of coating composition.

For comparative purposes, the above process was duplicated except that in place of the calcined pigmentary form of $TiO_2$ therein used, an uncalcined, hydrated form of raw $TiO_2$ pigment containing a substantial amount of combined water was employed. As a result, it was found that substantially no reaction occurred between the phthalonitrile and the cuprous chloride, and a non-coalesced type of product was obtained. This product was almost devoid of blue color and when compared directly with the coalesced pigment prepared as above, was found to be green and dull in appearance, and of such extreme weakness as to lack sufficient strength for pigment usefulness. When incorporated in the same type of lacquer, such lacquer gelled badly and the pigment settled out completely.

*Example II*

A preparation was carried out as in Example I except that 17 g. of anhydrous aluminum chloride was used in place of the cuprous chloride, the charge was baked at 200° C. instead of 180° C., and a calcined, anhydrous rutile $TiO_2$ pigment was used. The product was a greenish blue pigment comprising aluminum phthalocyanine coalesced on the $TiO_2$ substratum.

Example III

A cast iron rotary baker similar to the apparatus of Example I was charged with 225 parts of a calcined pigment-developed rutile $TiO_2$, the particles of which had been coated, subsequent to calcination, with the hydrous oxides of titanium, aluminum and silicon in amounts of the order of a total of 1–2%, 71 parts of phthalonitrile and 19 parts of anhydrous cupric chloride. The charge was mixed to uniformity in the rotary baker which contained a number of steel bars to keep the charge constantly agitated. After mixing, the temperature of the charge was raised to about 200° C. by direct gas firing heating, in about 1½ hours and maintained between 200° C. and 250° C. for about 2 hours. After cooling, the charge was dumped and found to comprise a uniform, friable blue powder of excellent utility as a pigment without further treatment than a simple pulverization. Theoretically, the product should comprise 25% monochloro copper phthalocyanine and 75% $TiO_2$. Actual analyses of typical products approximate 20% monochloro copper phthalocyanine and 70–75% $TiO_2$, the remainder comprising a mixture of products including unreacted phthalonitrile, some unreacted copper salt and some phthalimide formed as a by-product.

Example IV

The process of Example III was duplicated except that a calcined, anhydrous form of pigmentary zirconium oxide was substituted for the titanium oxide pigment used in said example. A blue pigment of substantially equivalent properties was obtained. Exactly as in the instance of the titanium compound, when an uncalcined, hydrated form of zirconium oxide was used for comparative results, such hydrated form was found to inhibit the dyestuff-forming reaction.

Example V

A well-ground mixture consisting of 125 parts of dry phthalonitrile, 225 parts of a calcined pigmentary form of rutile $TiO_2$ which had been treated subsequent to calcination with small amounts (½%) of the hydrous oxides of titanium, aluminum and silicon, 9.1 parts of sodium oxide, and 4 parts of methylglucamine was heated in a rotary baker under constant grinding and mixing conditions for 6 hours at 210–220° C. The charge was then allowed to cool, under continued agitation, to room temperature and the finely-ground, greenish-blue powder was discharged from the baker. The crude product thus obtained is a metal-free phthalocyanine coalesced with the $TiO_2$ substratum.

To remove the soluble ingredients, a portion of the crude product was extracted with much distilled water, the insoluble pigment was filtered off, and the filter cake dried at 100° in an air oven. The product thus obtained showed surprisingly high tinctorial strength and a very considerably greener shade when used as pigment in paints, as compared with a mechanical mixture consisting of the corresponding amounts of the standard metal-free phthalocyanine toner, extended with the same amount of $TiO_2$. Unlike this mechanical mixture, the baked product gave paints which are entirely free of flocculation and crystal growth of the pigments.

Example VI

An intimately-ground mixture consisting of 100 parts of dry phthalonitrile, 300 parts of a calcined rutile $TiO_2$ pigment which subsequent to calcination was treated with small amounts (½%) of the hydrous oxides of titanium, aluminum and silicon, 10 parts of calcium oxide and 6 parts of methyl glucamine, was heated in a rotary baker under constant grinding and mixing conditions for 2 hours at 160° to 170° C. and then for 4 hours at 215–220° C. The charge was then allowed to cool under continued agitation to room temperature and the finely-ground, greenish-blue powder was discharged from the baker. The crude product thus obtained is a metal-free phthalocyanine coalesced with the $TiO_2$ substratum and, without any further finishing treatment, consisted of a highly desirable pigment useful in the manufacture of paints and the like with attractive greenish-blue shades.

Example VII

To demonstrate the properties of the coalesced pigment of Example III, as compared with a commercial prior art copper phthalocyanine toner, six enamel mill bases were prepared by grinding the ingredients shown in the following table in a conventional type ball mill to enamel fineness in a manner well known to those skilled in the art. (Parts are by weight in each case):

| Paint | A | B | C | D | E | F |
|---|---|---|---|---|---|---|
| Coalesced Pigment of Example III | 10 | | 4 | | 5 | |
| Commercial copper phthalocyanine | | 2.5 | | 1 | | 6.2 |
| Titanium Dioxide Pigment | | 7.5 | 6 | 9 | | 3.8 |
| Alkyd Resin Vehicle (50% solids) | 28 | 28 | 28 | 28 | 28 | 28 |
| Mineral Spirits | 12 | 12 | 12 | 12 | 12 | 12 |

The titanium dioxide pigment used was the same grade of hydrous-oxide-coated titanium dioxide pigment employed as a raw material for the coalescence in Example III, and the alkyd resin vehicle used comprised a commercially-available type of product.

When completely ground, 50 parts of each mill base was mixed with 50 parts of the same alkyd resin vehicle and about 10 parts of mineral spirits to a suitable consistency for application. The resulting paints may be described as follows:

Paint A—Full shade enamel of the coalesced pigment.

Paint B—Mix of copper phthalocyanine toner and titanium dioxide pigment containing the same proportions of colored and white pigments.

Paint C—Enamel of coalesced pigment extended with additional $TiO_2$.

Paint D—Mix of copper phthalocyanine and titanium dioxide pigment corresponding to paint C in proportions.

Paint E—Enamel of coalesced pigment fortified with additional copper phthalocyanine toner.

Paint F—Mix of copper phthalocyanine toner and titanium dioxide pigment corresponding to Paint E in proportions.

Test panels of these enamels may be prepared by either brushing, spraying or dipping. The shades of panels prepared from paints A, C and E are not affected by the method of application, being in each case uniform in appearance and from from streaking or specking. On the other hand, panels from paints B, D and F, mixes of toner and titanium dioxide pigment, show pronounced differences in shade depending on the method of application. Only by spraying is it possible to obtain a satisfactory appearance approximating the shade of the corresponding enamel containing the coalesced pigment. When application is by brushing, the surfaces always show bad streaking due to the non-uniform breaking up of the flocculates. When application is by dipping or pouring, the shade is much weaker and some specking or streaking usually occurs. Furthermore, if the partially-dried surface of the test panels is disturbed as by rubbing, the appearance of paints A, C and E is not altered while paints B, D and F will invariably appear stronger.

Finally, on shelf storage, paints A, C and E show only a normal amount of settling with no separation of pigments of different color. On the other hand, under the same conditions, paints B, D and F show a pronounced separation or stratification into a blue layer and a white layer, very difficult to reincorporate to a uniform enamel.

Although this example illustrates the preparation of enamels from a specific vehicle, it is not limited thereto. Comparable results may be obtained with any of the common vehicles of the coating composition art varying from a completely oxidizing vehicle such as raw linseed oil, to a non-oxidizing type such as nitro-cellulose lacquer.

Because of the improved nature of the pigments of this invention, particularly their relatively greater tinting strength per unit of phthalocyanine dyestuff and freedom from the deficiencies mentioned above as characteristic of prior phthalocyanine pigments, they possess certain great economic advantages and hence are useful in any pigmented coating composition (paints, enamels, lacquers, etc.) where their color is desirable. Their freedom from crystal growth renders possible the formulation of coating compositions from phthalocyanine pigments which are completely free from change on storage; and their freedom from flocculation renders possible exact color matching with compositions containing phthalocyanine pigments, this having been extremely difficult heretofore and in many cases completely impossible with prior art phthalocyanine pigments. Another economic advantage resides in their substantially lower cost of manufacture, due to the elimination of the acid-pasting or other conditioning steps necessary in the production of prior phthalocyanine pigments. Most of the pigments of this invention are of blue-to-green shade and have special utility in the formulation of blue-to-green paints or enamels. They are extremely fast to light and to most chemical agents. They have unusual utility in linoleum because of a very remarkable ease of dispersion in linoleum compositions, which property is entirely unexpected and for which there is no present ready explanation. The pigments are also useful in printing inks, in coloring rubber, in coloring paper, coated textiles, plastics, crayons, and the like.

As noted, the invention is applicable to the production of either metal or metal-free phthalocyanines. While phthalonitrile, a preferred reactant, has been used in the examples, any ortho-arylene dinitrile may be used, such as naphthonitrile or phthalonitrile, with one or more substituent groups, such as chlor phthalonitrile or nitro phthalonitrile. Also contemplated as useful are derivatives of aromatic ortho dinitrile or compounds capable of converting under the reaction conditions into such dinitrile, such as phthalic imides, phthalic diamides, and ortho-cyano-benzamides, etc. The presence of substituent groups may affect the rates and effective temperatures of the reaction and may have pronounced effects upon the tinctorial properties of the resulting pigment. However, these effects are in every way comparable to those known in the prior art wherein the reactions are carried on in the absence of the useful substrata of this invention.

For the most part, the examples disclose the use of copper salts, particularly cuprous chloride and cupric chloride. However, it is contemplated that any other cupriferous agent, including metallic copper or any other metal or metallic salt which is useful and known by those skilled in the art to be utilizable in the preparation of phthalocyanine dyestuffs by reaction with phthalonitrile may be employed in place of the copper salt named. Of particular utility are salts of iron, nickel, aluminum and zinc, particularly the chlorides thereof, which are known to react with phthalonitrile to give the corresponding metallic phthalocyanine pigments. Moreover, it is possible to use non-neutral compounds of the alkali or alkaline earth metals, such as the oxides of sodium, potassium, calcium or barium, in which case the reaction product is the metal-free phthalocyanine coalesced on the substratum used. Examples V and VI describe this modification.

The relative proportions of phthalonitrile and metallic salt are not critical, excesses of each having been used experimentally without any substantial effect. Obviously the use of an appreciable excess over the theoretical amount of either ingredient is uneconomical and is usually avoided.

The anhydrous substrata contemplated for use herein are critical and essential to the attainment of the purposes and advantages of this invention and include the calcined pigmentary forms of the white, anhydrous (as distinguished from the uncalcined, hydrated variety) oxides of titanium and zirconium. These are readily obtained by precipitating the oxide through neutralization or hydrolysis of a soluble salt of titanium or zirconium, such as the sulfate, chloride, etc. Thereafter, the precipitated hydrate or hydrolysate is calcined at temperatures ranging from about 650-975° C. or higher to convert it to the anhydrous state and develop essential pigment properties. The methods disclosed in U. S. Reissue Patents 18,854 and 18,790 or U. S. Patents 2,062,133 and 2,062,134 are among those useful for obtaining an insoluble $TiO_2$ pigment, in either the anatase or rutile crystalline modification, adapted for use herein. The anhydrous substrata may be used alone in prime or pure state, and if desired mixtures of titanium and zirconium oxides may be employed. If desired also, the $TiO_2$ or $ZrO_2$ may be suitably extended with conventional type extenders, such as barium sulfate, calcium sulfate (anhydrite) or calcium carbonate, etc. Of particular and outstanding usefulness in the invention is pigmentary titanium dioxide coated subsequent to calcination with small amounts (from about 1–2%, based on the pigment) of the white hydrous oxides contemplated in U. S. Patents 2,212,935, 2,218,704, and 2,232,168. Especially useful and preferred is pigmentary titanium dioxide coated after calcination with about 1–2% of the hydrous oxides of titanium, aluminum and silicon precipitated on said $TiO_2$. The necessity of utilizing anhydrous forms of substrata to obtain the benefits of this invention is apparent from the fact that the uncalcined, non-pigmentary or hydrated titanium and zirconium oxides are inoperative for use herein since they fail to provide the results which the anhydrous forms afford. For instance, it would be highly attractive from an economic point of view to use the dry, inert titanium hydrate normally comprising the raw pigment or hydrolysate subjected to calcination in commercial $TiO_2$ pigment manufacture to develop its pigmentary properties. However, upon attempting to use such products as the substrata herein, not only will the final products possess the characteristically poor pigment properties of the uncalcined titanium dioxide, but substantially no formation of phthalocyanine dyestuff will take place. Hence, the sole use of titanium or zirconium hydrates as the substratum effectively inhibits the reaction between phthalonitrile and metallic salts to form phthalocyanine dyestuffs. This is especially surprising in view of the fact that when calcined titanium dioxide which has been coated with hydrous oxides of various metals is used herein, not only does it not inhibit formation of the dyestuff, but pigments of the greatest value are found to result only when the pigmentary forms of titanium dioxide are used which, subsequent to calcination, have been coated with small amounts of the hydrous oxides, as disclosed in said U. S. Patents 2,212,935, 2,218,704 and 2,232,168.

The temperature of reaction resorted to is not at all critical and may vary in a manner well known to those skilled in the art between about 150–300° C. Temperatures above about 300° C. are undesirable since they affect to a harmful extent the tinctorial properties of phthalocyanine pigments. In general, it is preferred to operate at temperatures between 180–250° C.

The conditions of reaction are, likewise, not especially critical. It is essential that the reactants as well as the substratum be intimately mixed before any conversion to the dyestuff takes place. It is desirable, though not absolutely essential, that some mixing action continue during the conversion of the phthalonitrile and metallic salts to the dyestuff. One particularly useful apparatus for this purpose comprises a rotary baker, provided with means for controlling the temperature and for maintaining intimate mixing of the reactants throughout the period of reaction, such as that shown and described in U. S. Patent 2,153,000. The most important requirement of such apparatus is the existence of adequate means for heat transfer and, if such a provision is made, it is entirely feasible to operate in a stationery type baker, say, in thin layers. It is likewise feasible to convert the process to a continuous operation, say, by operating in thin layers on a belt moving through a heated zone or in a rotary kiln in which the material moves through a heated zone at a predetermined rate.

It is well-known in the phthalocyanine art that the metal used in the apparatus, in which the reaction between phthalonitrile and the metallic salt takes place, has a definite effect on the quality of the resulting phthalocyanine pigments. This is not surprising since many metals will react directly with phthalonitrile. Consequently, it has been necessary to choose the metal used in any given case with care, nickel or nickel alloys being commonly used, though iron and various stainless steels have also been successfully used. In any case the effect of the various metals of construction is well known and, though an important consideration for commercial operations, the use of any given metal is not critical to this invention.

As noted above, the products of this invention comprise friable powders and require only pulverization treatment for utility as pigments. The usual processes of acid-pasting or other conditioning operations customary with all prior art phthalocyanine pigments production are not only not necessary in the present invention, but actually reduce the utility of the product by destroying certain desirable properties. On the other hand, the products of this reaction tend to be somewhat acidic in nature (a pH of 4–5), they also may contain certain water-soluble by-products of the reaction, such as phthalimide, and they may contain unreacted copper salts. For some uses, the presence of the water-soluble salts may be undesirable but in such instances this condition is readily eliminated by a simple extraction with water or dilute alkaline solutions.

The amount of anhydrous titanium and zirconium substratum used may vary within rather wide limits. Generally speaking, it is not practical to use amounts less than approximately equal to the amount of phthalocyanine dyestuff formed, although satisfactory results have been obtained when an amount of about one-half the phthalocyanine dyestuff formed is employed. At the other extreme, products containing more than twenty parts of substratum per part of dyestuff are so faintly colored as to have relatively little utility, although they are entirely practicable to manufacture. Thus, the amount of the dyestuff is not a critical feature of the invention, but for practical purposes it has been found that a desirable compromise in all properties will be obtained within the range of one part dyestuff to from three to twenty parts of anhydrous substratum. For reasons which will be made more apparent hereafter, the most preferred proportion is one part dyestuff to three parts substratum or approximately this proportion, since an optimum form of product has been found to result when appropriate amounts of phthalonitrile and cupric chloride are intimately mixed with three parts (based on the theoretrical amount of phthalocyanine pigment formed as one part) of an oxide-coated titanium pigment such as one of those described in U. S. Patents 2,212,935, 2,218,704, and 2,232,168.

The products of this invention comprise "coalesced pigments," this term having been defined above as referring to a combination of two or more pigments which behave as a single material. That the products of this invention are not simple mechanical mixtures is readily ascertainable in a number of ways, one of the most significant being its definitely different and improved tinctorial properties from separately-prepared, mechanical mixtures of the same theoretical ingredients. Thus, coalesced pigments containing copper phthalocyanine and the hydrous oxide-coated forms of titanium dioxide pigments are always greener than mechanical mixtures otherwise equivalent thereto. They likewise show appreciably greater tinting strength per unit of dyestuff present. Another excellent method of distinguishing coalesced pigments from mechanical mixtures is through the use of photomicrographs, particularly those obtained on the electron microscope. It is always possible in the case of mechanical mixtures to distinguish the separate particles of phthalocyanine dyestuff and the titanium pigment used as the substratum. On the other hand, when there is a relatively small amount of dyestuff present in a coalesced pigment, say, in the ratio of 1/20, electron micrographs fail to show any separate particles of dyestuff and are substantially identical with the titanium pigment used. At higher ratios of dyestuff, say, in the proportion of 1/3, there is frequently some evidence of free dyestuff but the particles of substratum generally show shaded or feathery edges, thus suggesting that the dyestuff has been deposited on the surface of the particles of the substratum. Additional evidence of the coating of the substratum by the phthalocyanine dyestuff is obtained through examination of electron diffraction patterns. The techniques of electron diffraction are well known and the patterns are generally accepted to be related to the surface structure of the particles rather than to the interior structure. It is noteworthy that whereas the electron micrographs of coalesced pigments show the particles to more nearly resemble the particles of substratum, electron diffraction patterns of the same pigments show partial obliteration of the substratum pattern, as compared with mechanical mixtures. This is interpreted as indicative of a coating of the substratum.

The exact nature of the mechanism by which a phthalocyanine dyestuff and a substratum are bound together to form a coalesced pigment of this invention is not presently clearly understood. The foregoing establishes the existence of a true coalescence and leads to the conclusion that the attractive forces between the particles are more than physical in nature.

Further evidence of the distinctive character of the products of this invention is manifested in their behavior when incorporated into the usual vehicles of coating compositions and formulated into lacquers, enamels, and the like. As noted above, many phthlocyanine pigments have serious deficiencies for such uses and their utility has been severely limited because of these deficiencies. Mechanical mixtures of phthalocyanine pigments and substrata in general have exhibited the characteristic properties of the phthalocyanine pigments, particularly crystal growth in the presence of solvents, separation of the pigments from each other and flocculation in the vehicle. These deficiencies have been particularly serious with copper phthalocyanine and with metal-free phthalocyanine which, in other respects, have shown the greatest utility of any of the phthalocyanine pigmented compositions. It is a very remarkable fact that the products of this invention show, in substantially all cases, none of these deficiencies. No crystal growth manifests itself in the presence of solvents so that these pigments can be formulated into coating compositions which are stable on storage. Furthermore, they show substantially no evidence of separation. Moreover, the products of this invention are not only free from the deficiencies of separation and flocculation but they also, in a very remarkable manner, inhibit the flocculation and separation of mixtures of these pigments with additional phthalocyanine pigments, with additional substratum, or both, and they even inhibit flocculation of mixtures of these pigments with entirely separate types of pigments. This results in a very remarkable and unusual freedom in the formulation of various shades of colored coating compositions from the pigments of this invention. However, the effectiveness of this inhibition of separation and flocculation is not uniform over the whole range of possible pigments. For instance, those pigments containing relatively large proportions of phthalocyanine dyestuff effectively inhibit flocculation in the presence of added phthalocyanine dyestuff but are not so effective in inhibiting flocculation in the presence of added substratum. Those coalesced pigments containing relatively large amounts of substratum effectively inhibit separation and flocculation in the presence of additional substratum, but are much less effective in inhibiting these deficiencies in the presence of additional phthalocyanine dyestuff. Consequently, although the pigments at each extreme of the range may have definite utility for special purposes, the most universally valuable pigments are found in a relatively narrow portion of the range and it is for this reason that the pigment containing one part of phthalocyanine and three parts of the pigmentary titanium dioxide has been selected as the prefered commercial form of this invention. Such a pigment will tolerate the addition of relatively large amounts of either dyestuff or substratum, or both, tints containing as little as one part of dyestuff to 100 parts of titanium pigment having been made from such a composition with substantially no evidence of flocculation. Furthermore, pigments of entirely different chemical properties can be added for shading purposes without fear of flocculation. Thus, such dissimilar materials as Ferrite Yellow and organic vat dyes can be safely used.

I claim as my invention:

1. A process for producing a coalesced phthalocyanine coloring material, which comprises reacting in the substantial absence of moisture and at temperatures ranging from about 150–350° C. an aryl-orthodinitrile with a compound of a metal in the presence of from one-half to twenty parts per part of phthalocyanine pigment in the mixture of a substratum which is potentially reactive with said coloring material, comprising a calcined, anhydrous, white, inorganic pigment substance selected from the group consisting of titanium oxide and zirconium oxide.

2. A process for producing a coalesced phthalocyanine pigment free from any tendency to flocculate or separate in a coating composition vehicle, comprising reacting phthalonitrile and a metal salt in the dry state and at temperatures ranging from 150–350° C. in the presence of from one-half to twenty parts per part of phthalocyanine pigment in the mixture of a substratum which is potentially reactive with said coloring material, comprising a calcined, anhydrous, white, inorganic pigment substance selected from the group consisting of titanium oxide and zirconium oxide.

3. A process for producing a coalesced phthalocyanine pigment free from any tendency to flocculate or separate in a coating composition vehicle, comprising reacting an intimate mixture of phthalonitrile and a metallic salt in the substantial absence of moisture and at a temperature of from 180–250° C. in the presence of from one-half to twenty parts per part of phthalocyanine pigment in the mixture of a substratum which is potentially reactive with said coloring material, comprising a calcined, anhydrous, white, inorganic pigment substance selected from the group consisting of titanium oxide and zirconium oxide.

4. A process for producing a coalesced phthalocyanine pigment free from any tendency to flocculate or separate in a coating composition vehicle, comprising reacting an intimate mixture of phthalonitrile and a copper salt in the substantial absence of moisture and at a temperature of from 180–250° C., in the presence of from one-half to twenty parts per part of phthalocyanine pigment in the mixture of a substratum which is potentially reactive with said coloring material, comprising a calcined, anhydrous, white, inorganic pigment substance selected from the group consisting of titanium oxide and zirconium oxide.

5. A process for producing a coalesced phthalocyanine pigment free from flocculation and separation when incorporated in coating composition vehicles, which comprises reacting for a period of from one-half to three hours, in the substantial absence of moisture, and at a temperature ranging from about 180°–250° C., an agitated, intimate mixture of phthalonitrile, cupric chloride, and an anhydrous, calcined titanium dioxide pigment, the amount of calcined pigment present in said mixture ranging from about one-half to about twenty parts of $TiO_2$ per calculated part of phthalocyanine pigment in the mixture, cooling the resulting friable reaction product and reducing the same to pigmentary particle size.

6. A process for producing a coalesced phthalocyanine pigment free from flocculation and separation when incorporated in coating composition vehicles, which comprises reacting for a period of from one-half to three hours, in the substantial absence of moisture, and at a temperature ranging from about 180°–250° C., an agitated, intimate mixture of phthalonitrile, cupric chloride, and an anhydrous, calcined zirconium oxide pigment, the amount of calcined pigment present in said mixture ranging from about one-half to about twenty parts of $ZrO_2$ per calculated part of phthalocyanine pigment in the mixture, cooling the resulting friable reaction product and reducing the same to pigmentary particle size.

7. A process for producing a coalesced phthalocyanine pigment free from flocculation and separation upon being incorporated in coating composition vehicles, comprising reacting for a period ranging from one-half to three hours, in the substantial absence of moisture, and at a temperature ranging from about 180–250° C., an agitated, intimate mixture of phthalonitrile, cupric chloride, and an anhydrous, calcined titanium dioxide pigment coated with small amounts of the white, hydrous oxides of titanium, aluminum, and silicon, the amount of titanium dioxide pigment present in said mixture ranging from about one-half to about twenty parts of $TiO_2$ per calculated part of phthalocyanine pigment present in the mixture, cooling the resulting friable reaction product and reducing the same to pigmentary particle size.

ALFRED SIEGEL.

REFERENCES CITED

The following references are of record in the file of this patent:

UNITED STATES PATENTS

| Number | Name | Date |
|---|---|---|
| 2,238,243 | Black | Apr. 15, 1941 |